United States Patent [19]

Kawamura

[11] Patent Number: 5,594,785

[45] Date of Patent: Jan. 14, 1997

[54] METHOD OF PRODUCING RING-BACK TONE IN ORDER WIRE

[75] Inventor: Kazutoshi Kawamura, Kawasaki, Japan

[73] Assignee: Fujitsu Limited, Kanagawa, Japan

[21] Appl. No.: 524,873

[22] Filed: Sep. 7, 1995

[30] Foreign Application Priority Data

Feb. 14, 1995 [JP] Japan ................................... 7-025352

[51] Int. Cl.[6] ........................................ H04M 11/00
[52] U.S. Cl. ............................................ 379/90; 379/338
[58] Field of Search ........................... 379/90, 1, 9, 12, 379/14, 27, 34, 63, 350, 351, 338, 370; 370/55, 112, 119; 455/58.2; 340/825.02, 825.08, 825.52

[56] References Cited

U.S. PATENT DOCUMENTS 5,347,565  9/1994  Uekama .................................. 379/338

FOREIGN PATENT DOCUMENTS

4-360355  12/1992  Japan .

*Primary Examiner*—Wing F. Chan

[57] ABSTRACT

In an order wire as an auxiliary line for use in the installation and maintenance of communication equipment, a method of producing a ring-back tone includes of transmitting a DTMF signal on the side of the calling station, causing a call-in tone to be produced, on the side of the called station, when a specific condition is satisfied, transmitting a ring-back tone signal, on the side of the called station, containing data related to the station number of the calling station, and causing a ring-back tone to be produced, on the side of the calling station, when a specific condition is satisfied. By using the method, the ring-back tone is produced only in the calling station without the need for an exchange apparatus.

2 Claims, 8 Drawing Sheets

METHOD OF PRODUCING RING-BACK TONE IN ORDER WIRE

BACKGROUND OF THE INVENTION

1. Field of the Invention

The present invention relates generally to an order wire, which is an auxiliary wire for use in the installation and maintenance of communication equipment, and more particularly to a simple method of producing a ring-back tone in an order wire. The term "ring-back tone" herein means a signal tone informing the transmitter side of the fact that a calling signal is being sent to the receiver side.

2. Description of the Related Art

A dual-tone multifrequency signal (DTMF signal) is known as a signal used in transmitting a calling signal and a ring-back tone signal over a communication line (including the order wire) such as the telephone line. The DTMF signal is that which uses a combination of one frequency out of low-group frequencies and one frequency out of high-group frequencies for representing a numeral or a symbol, and the signal is identified and the numeral or symbol is regenerated by a circuit formed of a suitable filter and the like.

In a communication system including a plurality of stations, there is sometimes established an order wire for installing and maintaining communication equipment between any two stations (the calling station and the called station). In that case, the calling station calls the called station with a DTMF signal and the called station notifies the calling station of the fact that it is being called using a voice calling function of the order wire. In ordinary communication lines, the called station sends a ring-back tone to inform the calling station of its being called. However, since it is normal practice not to use an exchange apparatus in an ordinary order wire, when a called station sends out a ring-back tone signal, the ring-back tone signal is received not only by the calling station but also by a plurality of other stations and trouble is caused. In order that the ring-back tone is produced only in the calling station, exchange techniques are required but, then, the cost for constructing the system increases.

SUMMARY OF THE INVENTION

Accordingly, an object of the present invention is to provide a method of producing a ring-back tone only in the calling station without using any exchanging function.

According to a first aspect, there is provided a method by which, when a calling station selects a called station from a plurality of stations and an order wire is established between the calling station and the called station, a ring-back tone is produced only in the calling station which comprises the steps of transmitting a dual-tone multifrequency signal, on the side of the calling station, in accordance with the station number of the called station and the station number of the calling station, determining, on the side of the called station, as to whether the station number detected from the received dual-tone multifrequency signal is in agreement with the station number of its own station and causing a call-in tone to be produced when they agree with each other, transmitting a ring-back tone signal, on the side of the called station, in accordance with the station number of the calling station detected from the received dual-tone multifrequency signal, and determining, on the side of the calling station, as to whether the received ring-back tone signal is that addressed to its own station and causing a ring-back tone to be produced when the signal is that addressed to its own station.

According to a second aspect, there is provided a method by which, when a calling station selects a called station from a plurality of stations and an order wire is established between the calling station and the called station, a ring-back tone is produced only in the calling station, which comprises the steps of transmitting a dual-tone multifrequency signal, on the side of the calling station, in accordance with the station number of the called station, determining, on the side of the called station, as to whether the station number detected from the received dual-tone multifrequency signal is in agreement with the station number of its own station and causing a call-in tone to be produced when they agree with each other and, at the same time, transmitting a ring-back tone signal, and determining, on the side of the calling station, as to whether the timing at which the ring-back tone signal is received is within a predetermined period of time from the transmission of the dual-tone multifrequency signal and causing a ring-back tone to be produced only when the timing is within the period of time.

According to the first aspect of the invention, the called station is adapted to transmit a ring-back tone signal in accordance with the station number of the calling station detected from the DTMF signal received thereby and the calling station is adapted to determine whether the ring-back tone signal received thereby is that addressed to its own station and causing a ring-back tone to be produced when the signal is that addressed to its own station. Accordingly, it has been made possible to cause a ring-back tone to be produced only in the calling station without using any exchange function.

According to the second aspect of the invention, the called station is adapted to determine as to whether the timing of its receipt of a ring-back tone signal is within a predetermined period of time (for example, several seconds) after its transmission of the DTMF signal and cause a ring-back tone to be produced only when the period of time is within the period of time. Accordingly, it has been made possible to cause a ring-back tone to be produced only in the calling station without using any exchange function.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Hereinafter some preferred embodiments of the present invention will be described in detail with reference to the accompanying drawings.

Figure 1:
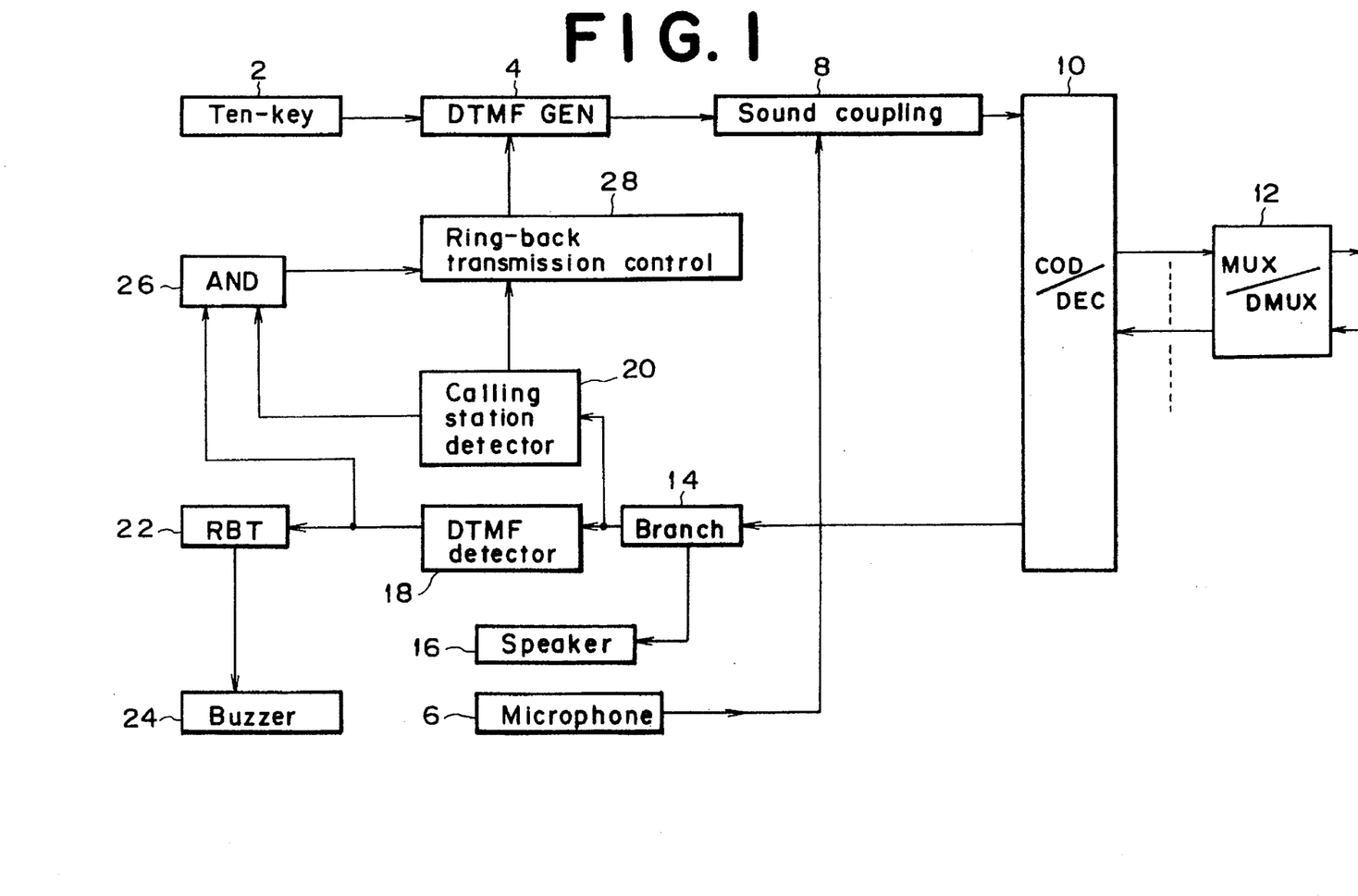
FIG. 1 is a block diagram of a station in a first embodiment of the invention.
Figure 2:
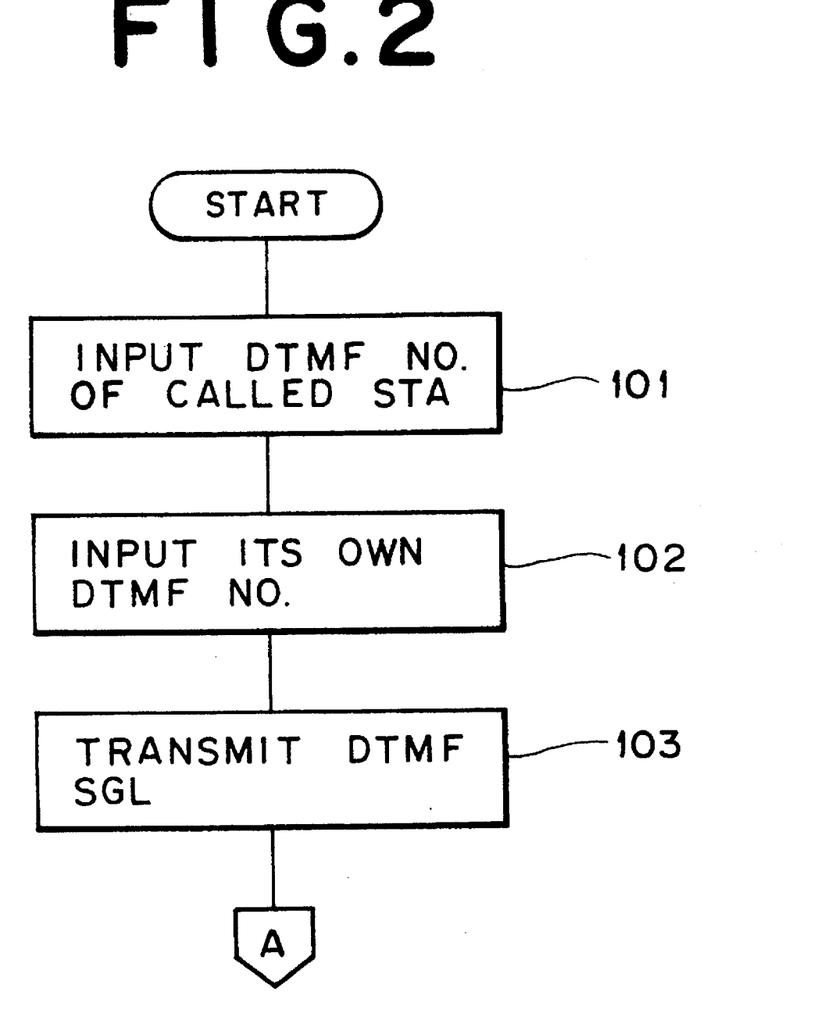
FIG. 2, FIG. 3, and FIG. 4 are flowcharts of steps executed in the first embodiment of the invention.
Figure 3:
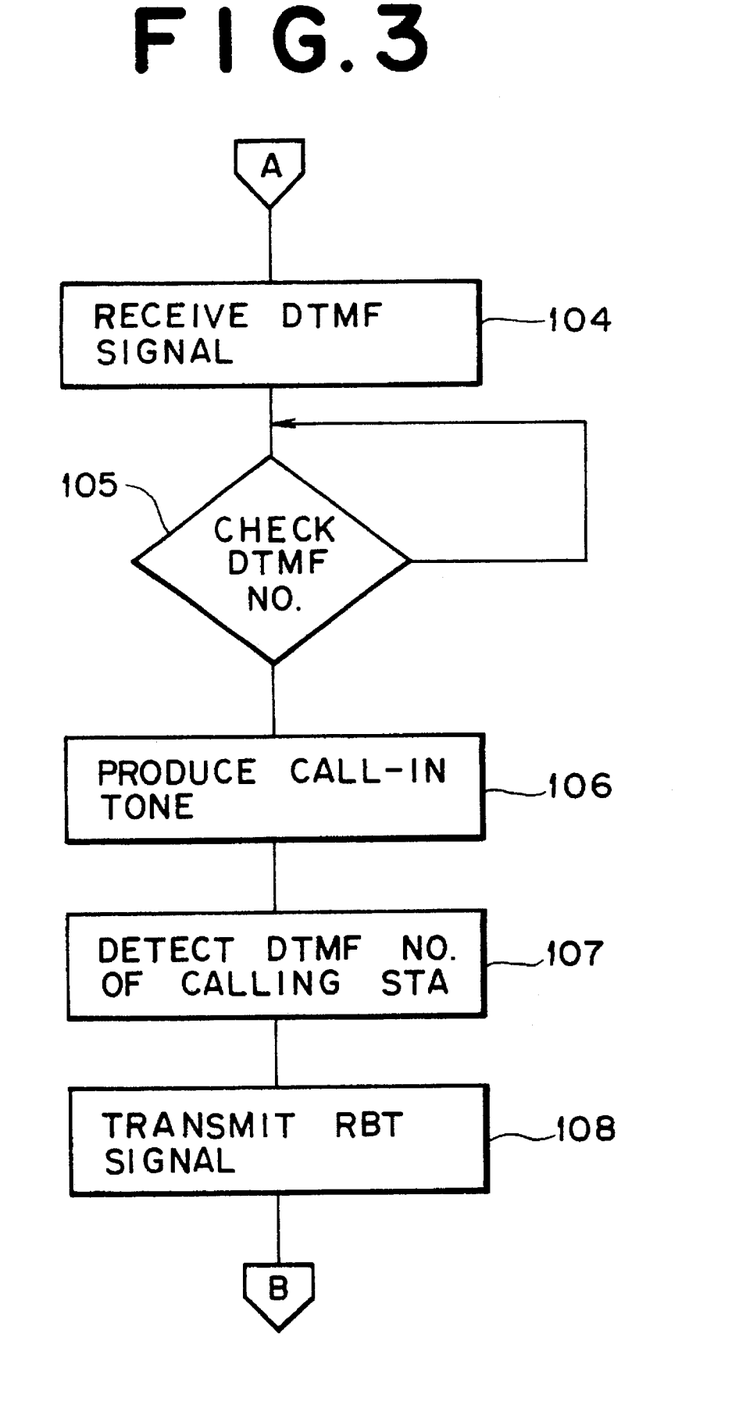
Figure 4:
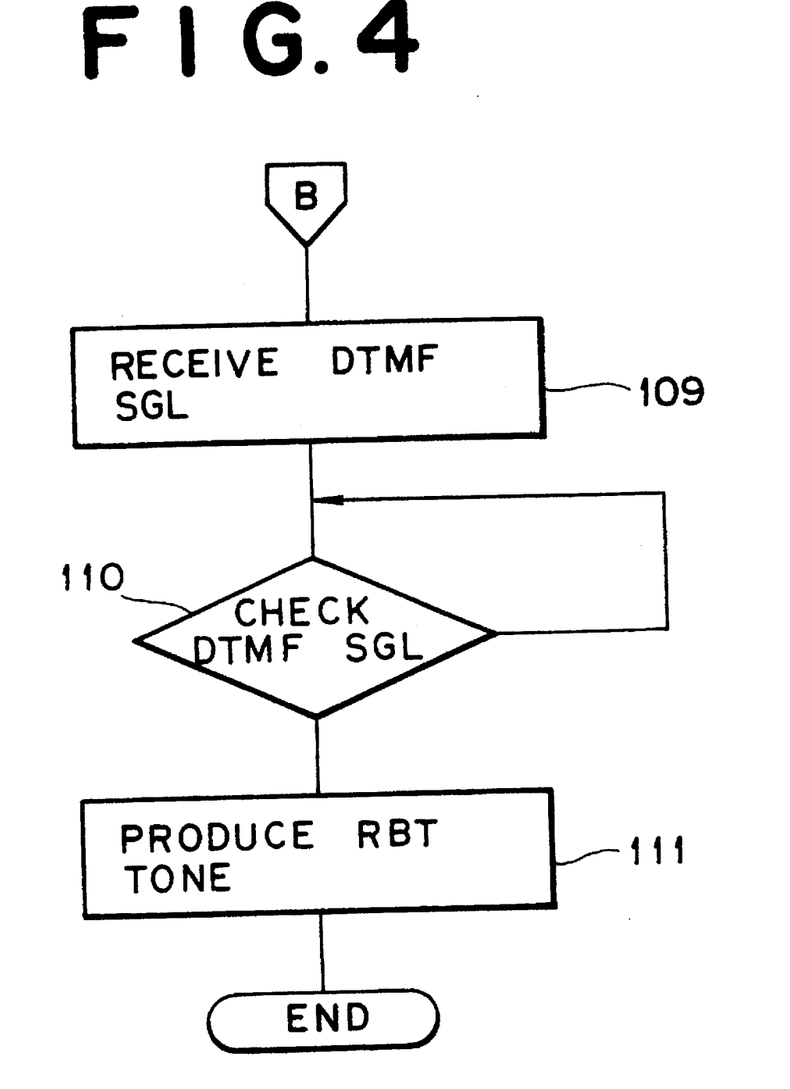

FIG. 1 is a block diagram of each station in a first embodiment of the invention and FIG. 2 to FIG. 4 are flowcharts of steps executed in the first embodiment.

Referring to FIG. 1, reference numeral 2 denotes a ten-key pad and a DTMF generator 4 is operated with the ten-key pad 2. A DTMF signal output from the DTMF generator 4 is coupled with a sound signal from a microphone 6 by a sound coupling circuit 8. The coupled signal is encoded by a COD/DEC circuit 10. The encoded signal is multiplexed on a main signal by a MUX/DMUX circuit 12 and transmitted over a transmission line, not shown. On the other hand, a signal received from the transmission line is demultiplexed by the MUX/DMUX circuit 12 and, then, decoded by the COD/DEC circuit 10 and supplied to a branch circuit 14.

The signal supplied to the branch circuit 14 contains a sound signal, a DTMF signal, and a ring-back tone signal (RBT signal). Outputs of the branch circuit 14 are supplied to a speaker 16, a DTMF detector circuit 18, and a calling station detector circuit 20. The output of the DTMF detector circuit 18 is supplied to an RBT circuit 22 so that the RBT circuit 22 drives a buzzer 24 to produce a ring-back tone. The output of the DTMF detector circuit 18 is also supplied, together with the output of the calling station detector circuit 20, to an GND circuit 26 and the output signal of the AND circuit 26 starts a ring-back transmission control circuit 28. The ring-back transmission control circuit 28 controls the DTMF generator 4 such that the number of the calling station detected by the calling station detector circuit 20 is transmitted again as the DTMF signal.

The flow of steps down to the step in which a DTMF signal is transmitted by the calling station will be described with reference to FIG. 2. First, in step 101, the DTMF number of the called station is input by to the DTMF generator 4 by using the ten-key pad 2, and then in step 102, the DTMF number of its own station is input to the DTMF generator 4 by also using the ten-key pad 2. Thereby, a DTMF signal containing data for specifying the called station and its own station is generated in the DTMF generator 4. The DTMF signal is passed through the sound coupling circuit 8, the COD/DEC circuit 10, and the MUX/DMUX circuit 12 and transmitted over the transmission line (step 103). The DTMF signal is produced, for example, by combining one frequency out of low-group frequencies (697 Hz, 720 Hz, 852 Hz, and 941 Hz) and one frequency out of high-group frequencies (1209 Hz, 1336 Hz, and 1477 Hz) and represents one numeral or symbol (including character). Thus, it becomes possible to specify, for example, numerals "1"–"9" and "0" and symbols "*" and "#".

Then, the flow of steps executed when the called station has received the DTMF signal will be described with reference to FIG. 3. First, in step 104, the DTMF signal from the calling station is received by the called station. In concrete terms, the main signal from the transmission line, passed through the MUX/DMUX circuit 12 and the COD/DEC circuit 10, is branched off by the branch circuit 14, and the DTMF signal as one of the branched signals is supplied to the DTMF detector circuit 18. In the DTMF detector circuit 18, which has the number (DTMF number) of its own station established therein, it is determined whether the number detected from the supplied DTMF signal and its own number agree with each other (step 105). When they agree, step 106 follows and therein the buzzer 24 is driven by the RBT circuit 22 so that a call-in tone is produced. When the station numbers are not in agreement, the flow does not proceed to step 106 and execution of the determination step 105 is repeated.

In step 107, another of the branched signals by the branch circuit 14 is supplied to the calling station detector circuit 20 and, therein, the number (DTMF number) of the calling station is detected. When the number of its own station (called station) is specified in the DTMF detector circuit 18 and the number of the calling station is detected in the calling station detector circuit 20, the output of the AND circuit 26 goes high and, thereby, the ring-back transmission control circuit 28 is started. By the starting of the ring-back transmission control circuit 28, the DTMF number corresponding to the number detected by the calling station detector circuit 20 is generated in the DTMF generator 4 and, at the same time, data (for example, a flag) indicating that the signal is the RBT signal is added to the signal and this signal is transmitted over the transmission line (step 108).

Referring to FIG. 4, there is shown a flow of steps executed when the calling station has received the RBT signal transmitted in step 108 of FIG. 3. In step 109, the calling station receives the RBT signal from the called station. In concrete terms, the main signal from the transmission line, passed through the MUX/DMUX circuit 12 and the COD/DEC circuit 10, is branched off by the branch circuit 14, and the ring-back tone signal (RBT signal) as one of the branched signals is supplied to the DTMF detector circuit 18. Since the RBT signal contains information related to the number of the calling station, it is decided in the DTMF detector circuit 18 whether the received RBT signal is that addressed to its own station (calling station) (step 110). When the signal is that addressed to its own station, step 111 follows and therein the buzzer 24 is driven by the RBT circuit 22 to produce a ring-back tone. When the signal is not that addressed to its own station, the flow does not forward to step 111 but execution of the determination step 110 is repeated.

When a telephone conversation is made between the calling station and the called station through the established order wire, the sound signal from the microphone 6 is passed through the sound coupling circuit 8, the COD/DEC circuit 10, and the MUX/DMUX circuit 12 and transmitted over the transmission line. On the receiving side, the sound signal as one of the branched signals by the branch circuit 14 causes the speaker 16 to produce sound. Since, in this embodiment, the called station is adapted to transmit the RBT signal in the form containing the data related to the number of the calling station which was detected from the received DTMF signal, the calling station can determine whether the received RBT signal is that addressed to its own station. Consequently, it is made possible to have the ring-back tone according to the ring-back tone signal from the called station produced only in the calling station. Since, no exchanging function is required in this case, cost reduction in constructing the system can be achieved.

Figure 5:
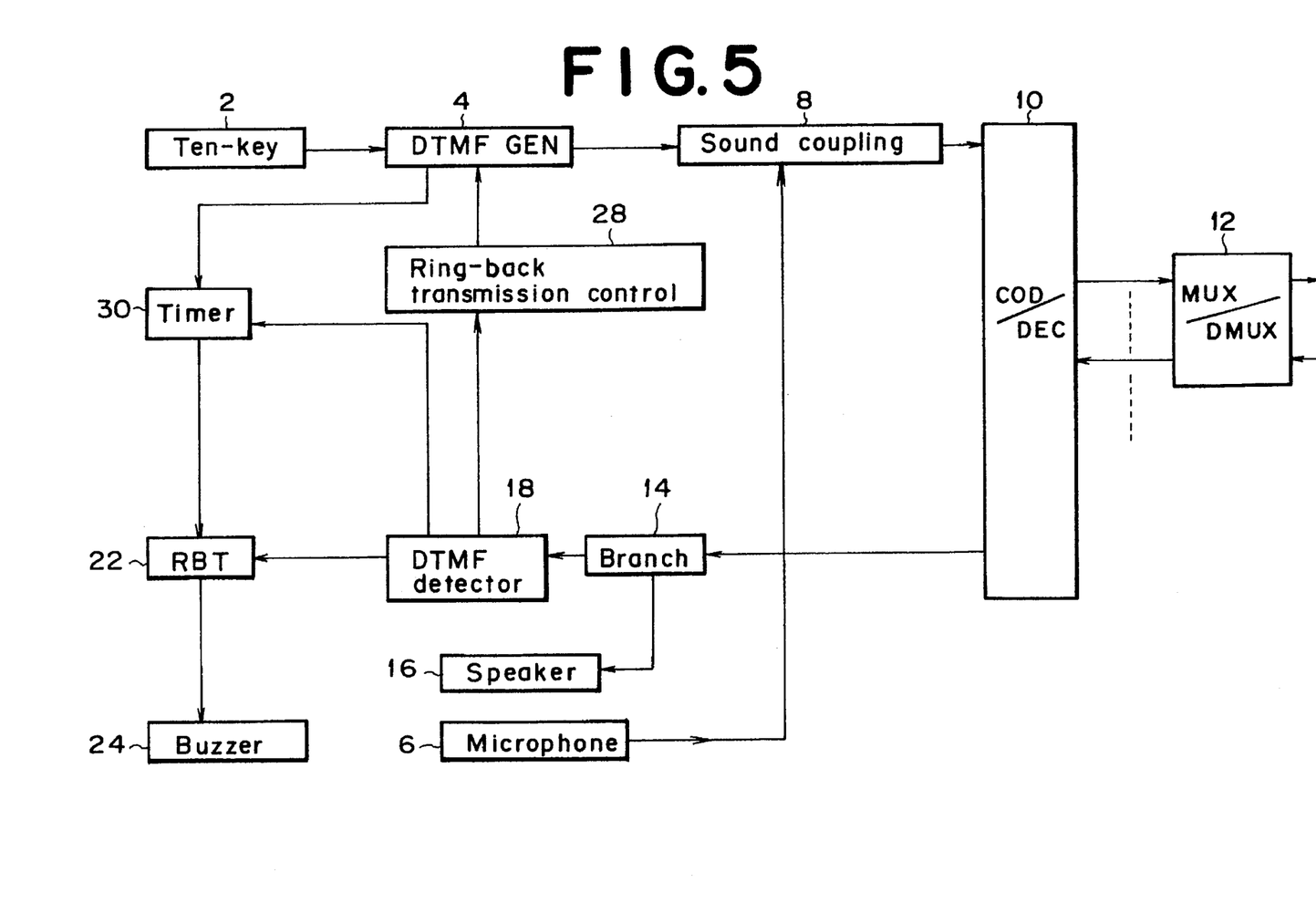
FIG. 5 is a block diagram of a station in a second embodiment of the invention.

FIG. 5 is a block diagram of each station in a second embodiment of the invention. While parts in FIG. 5 being virtually the same as those in the first embodiment shown in FIG. 1 are denoted by corresponding reference numerals, detailed description of the same will be omitted. This embodiment is characterized in that a timer 30 is provided therein for enabling the calling station to determine as to whether the timing of its reception of an RBT signal is within a predetermined period of time from its transmission of a DTMF signal for calling. The timer 30 is supplied with outputs of the DTMF generator 4 and the DTMF detector circuit 18 and the output of the timer 30 is supplied to the RBT circuit 22. The output of the DTMF detector circuit 18 is also supplied to the ring-back transmission control circuit 28.

Figure 6:
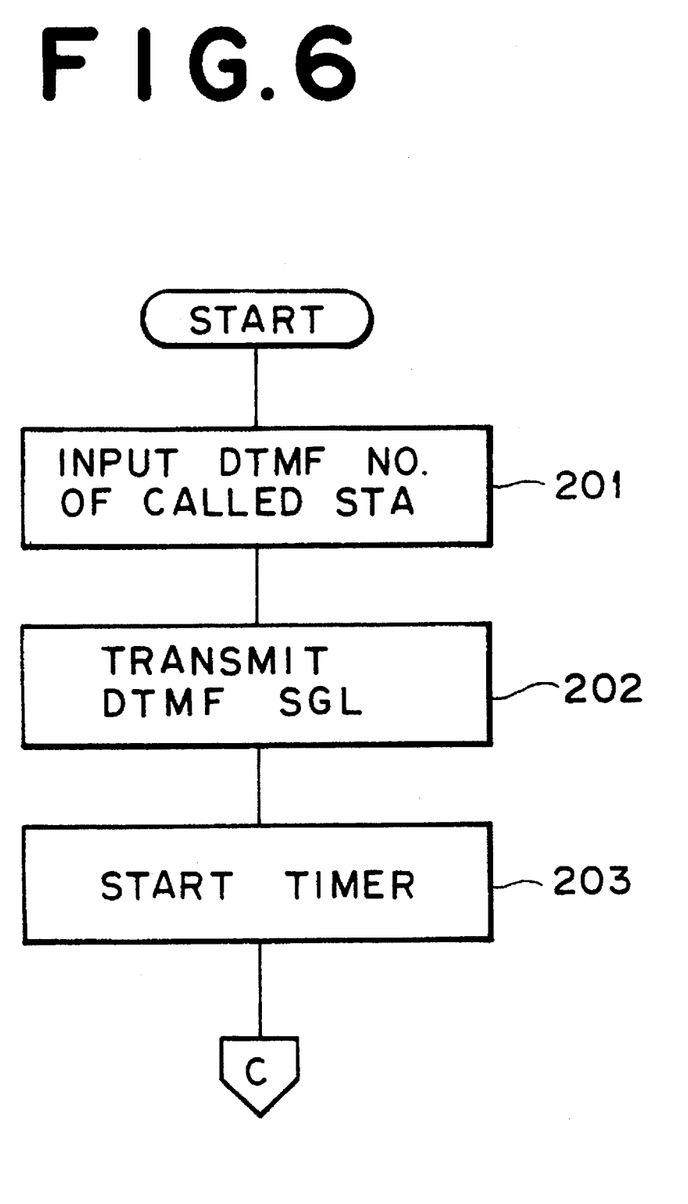
FIG. 6, FIG. 7, and FIG. 8 are flowcharts of steps executed in the second embodiment of the invention.

Referring to FIG. 6, there is shown a flowchart of steps executed when the calling station transmits a DTMF signal. In step 201, the number (DTMF number) of the addressed station as the called station is input to the DTMF generator 4 with the ten-key pad 2. The DTMF signal generated in the DTMF generator 4 is passed through the sound coupling circuit 8, the COD/DEC circuit 10, and the MUX/DMUX circuit 12 and transmitted over the transmission line (step 202). In this embodiment, inputting of the DTMF number of its own station corresponding to step 102 in FIG. 2 of the first embodiment is omitted. Instead of that, the timer 30 is started in step 203 upon transmission of the DTMF signal in step 202 in this embodiment. Namely, the calling station waits for an RBT signal to return using the timer 30.

Figure 7:
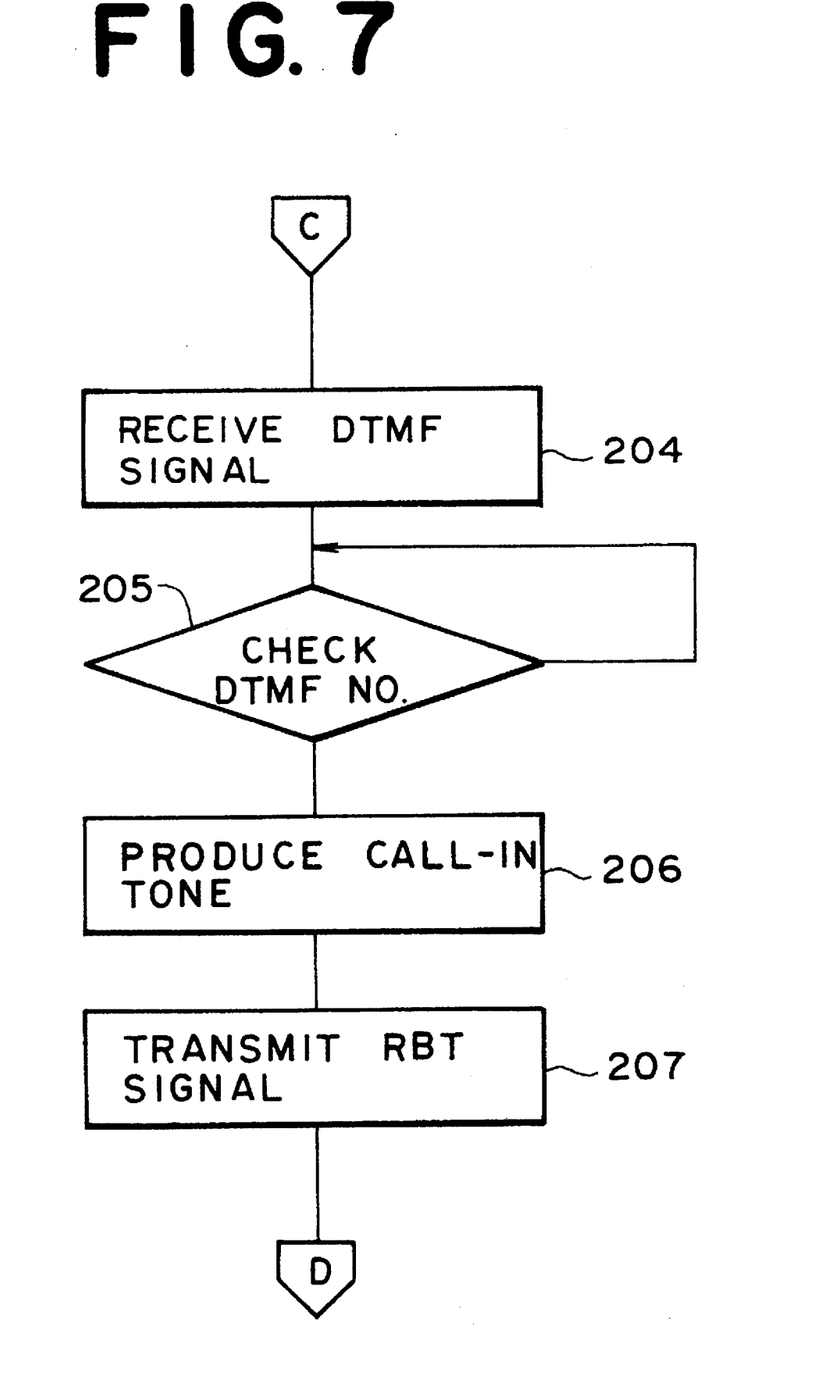

Referring to FIG. 7, there is shown a flow of steps executed by the called station during the period between its reception of the DTMF signal and its transmission of the RBT signal. The DTMF signal is received in step 204, it is decided whether the number detected from the received DTMF signal agrees with the number of its own station in step 205, and a call-in tone is produced in step 206. These operations are virtually the same as those performed in step 104 to step 106 in FIG. 3 of the first embodiment. Then, in this embodiment, the DTMF number of the calling station is not detected but a ring-back tone signal is transmitted in step 207. At this time, since the ring-back transmission control circuit 28 is directly started by the DTMF detector circuit 18, data related to the number of the calling station is not contained in the transmitted RBT signal.

Figure 8:
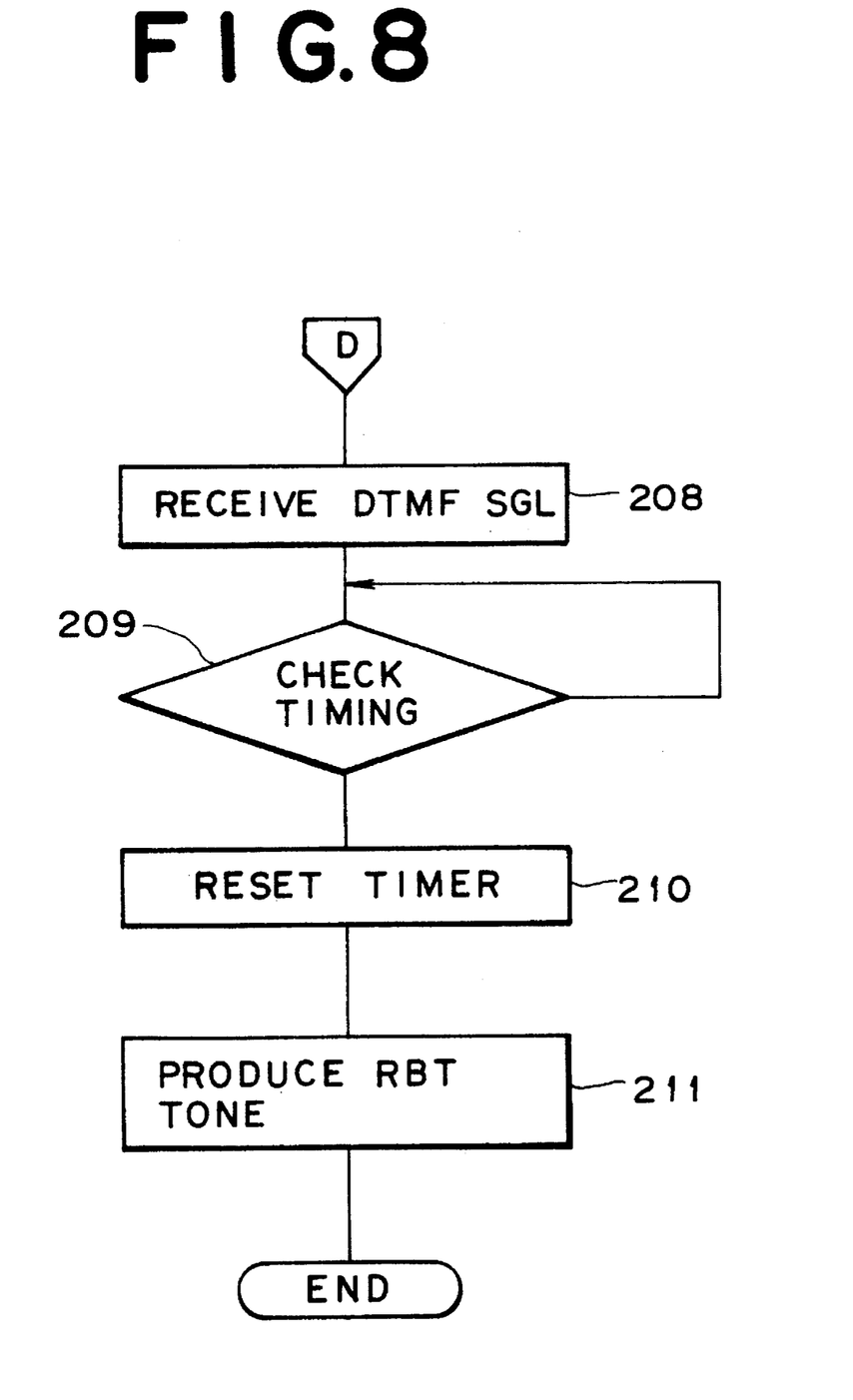

Referring to FIG. 8, there is shown a flow of steps executed during the period between reception of the RBT signal by the calling station and production of the ring-back tone. First, in step 208, the calling station receives the RBT signal. In concrete terms, the main signal from the transmission line is passed through the MUX/DMUX circuit 12 and the COD/DEC circuit 10 and supplied to the branch circuit 14, and the RBT signal as one of the branched signals is supplied to the DTMF detector circuit 18. In step 209, the RBT signal is supplied to the timer 30 through the DTMF detector circuit 18 and, then, it is determined whether the timing of the receipt of the RBT signal by the calling station is within a predetermined period of time from its transmission of the DTMF signal for calling. When it is within the period of time, step 210 follows and therein the timer 30 is reset. The predetermined time set by the timer 30 is for example several seconds. Then, in step 211, the ring-back tone is produced. In the event of a timeout, though it is not shown in the flowchart, the timer is reset without producing the ring-back tone. Also by this embodiment, it is made possible to produce the ring-back tone only in the calling station without using any exchanging function.

According to the invention, as described above, such a meritorious effect is obtained that it is made possible to produce the ring-back tone only in the calling station without using any exchanging function.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method for producing a ring-back tone in a calling station when the calling station selects a called station from a plurality of stations and an order wire is established between said calling station and said called station to produce a ring-back tone only in said calling station, the method comprising the steps of:

transmitting a dual-tone multifrequency signal, on the side of the calling station, in accordance with the station number of the called station and the station number of the calling station;

determining, on the side of the called station, as to whether or not the station number detected from the received dual-tone multifrequency signal is in agreement with the station number of its own station and causing a call-in tone to be produced when they are in agreement with each other;

transmitting a ring-back tone signal, on the side of the called station, in accordance with the station number of the calling station detected from the received dual-tone multifrequency signal; and determining, on the side of the calling station, as to whether or not the received ring-back tone signal is that addressed to its own station and causing a ring-back tone to be produced when the signal is that addressed to its own station.

2. A method for producing a ring-back tone in a calling station when the calling station selects a called station from a plurality of stations and an order wire is established between said calling station and said called station to produce a ring-back tone only in said calling station, the method comprising the steps of:

transmitting a dual-tone multifrequency signal, on the side of the calling station, in accordance with the station number of the called station;

determining, on the side of the called station, as to whether or not the station number detected from the received dual-tone multifrequency signal is in agreement with the station number of its own station and causing a call-in tone to be produced when they are in agreement with each other and, at the same time, transmitting a ring-back tone signal; and determining, on the side of the calling station, as to whether or not the timing, at which the ring-back tone signal is received, is within a predetermined period of time from the transmission of said dual-tone multifrequency signal and causing a ring-back tone to be produced only when the timing is within the period of time.

\* \* \* \* \*